United States Patent [19]

Nelson et al.

[11] Patent Number: 5,011,111
[45] Date of Patent: Apr. 30, 1991

[54] DAMPING CONTROL DEVICE

[76] Inventors: Marvin I. Nelson, 613 N. Washington, Dell Rapids, S. Dak. 57022; John S. Reedy, 1604 Keystone, Brandon, both of S. Dak. 57005

[21] Appl. No.: 481,866

[22] Filed: Feb. 20, 1990

Related U.S. Application Data

[63] Continuation of Ser. No. 375,039, Jul. 3, 1989, abandoned.

[51] Int. Cl.⁵ ............................................. F16K 31/383
[52] U.S. Cl. ...................................... 251/54; 92/85 B; 188/314
[58] Field of Search .......................... 91/440; 92/85 B; 188/300, 312, 313, 314, 316; 251/54

[56] References Cited

U.S. PATENT DOCUMENTS

| | | | |
|---|---|---|---|
| 1,936,788 | 11/1933 | Hardy | 188/313 |
| 2,905,462 | 9/1959 | Christensen | 251/54 |
| 3,098,502 | 7/1963 | Deve | 188/313 |
| 3,276,461 | 10/1966 | Kerensky | 251/54 |
| 3,286,797 | 11/1966 | Leibfritz et al. | 91/440 |
| 3,905,425 | 9/1975 | Jackson | 188/300 |
| 4,061,320 | 12/1977 | Warner | 188/314 |
| 4,255,930 | 3/1981 | Natalie | 92/85 B |
| 4,493,659 | 1/1985 | Iwashita | 188/300 |
| 4,695,226 | 9/1987 | Marchitto et al. | 188/314 |

*Primary Examiner*—George L. Walton
*Attorney, Agent, or Firm*—B. Craig Killough

[57] ABSTRACT

A damping control device which can be used to control the rate of movement or prevent the movement of a handle or other control means, such as a handle which is used to operate valves. This invention relates to control devices such as handles generally, and is more specifically directed to a damping means which can be used in conjunction with control devices, particularly those used to operate valves, to control the rate of actuation of said control device.

4 Claims, 1 Drawing Sheet

DAMPING CONTROL DEVICE

BACKGROUND OF THE INVENTION

Many devices have control means which are rotated or sliding in operation. These control devices most commonly present themselves as handles which are used to control a device by pushing or sliding or rotating the handle. Valves are a common example of devices which have external control means such as handles which are used to actuate the valves. This invention can be used with many types of devices, but valves are used for illustration of a common means of application of the device.

If a valve is opened too quickly, the substance which is being transported through the system may cause harm or damage due to the sudden pressure increase. This harm or damage may be simply illustrated by a fire hose which suddenly receives water through a nozzle as a valve is opened rapidly. The sudden pressure increase through the nozzle may cause harm or injury to the person attempting to control the hose. Other appliances which are "up stream" from a valve may be damaged due to sudden pressure rises from a fluid or other material which is transported through a system.

Likewise, the sudden closing of a valve may cause similar damage due to sudden back pressure increases. If a valve is suddenly and rapidly closed, back pressure increases may cause damage and failure to pumps which are located down stream from the valve, and sudden back pressure increases may even cause pipes or lines which are in the transport system to fail due to sudden back pressure increases.

SUMMARY OF THE INVENTION

The present invention is applicable to devices such as valves which have external control means which are rotated or pushed or slid so as to actuate the device. The present invention uses pistons which meet resistance within a cylinder containing a fluid so as to control the rate at which the control means is rotated so as to operate the subject device. The amount of resistance, or damping, may be adjusted as desired. A feature of the present invention allows the control means to be variably positioned in a partially open position as desired, and locked in that position without the valve "creeping", as a result of the hydraulic or fluid pressure on the piston.

DETAILED DESCRIPTION OF THE DRAWINGS

Figure 1:
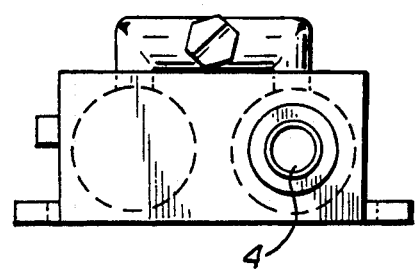
Figure 2:
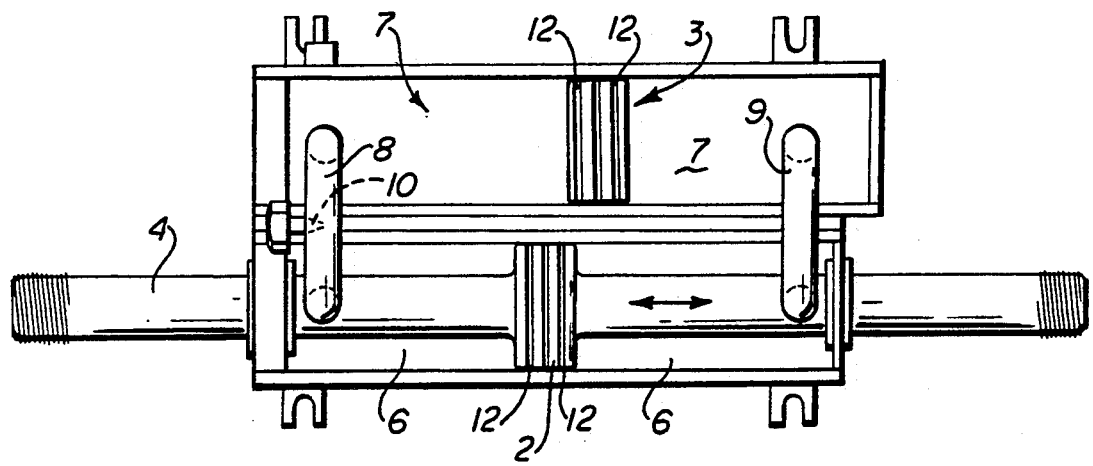

FIG. 1 is a side elevation of the valve damper.
FIG. 2 is a top sectioned view of the valve damper.

DETAILED DESCRIPTION OF THE PREFERRED EMBODIMENT

A preferred embodiment of the present invention includes a first piston 2 which travels within a cylinder 6. As the external control means 4 of the valve 12 is actuated, the piston 2 travels within a cylinder 6. The piston 2 meets resistance from a liquid, or hydraulic fluid, which is located within the cylinder 6, and the piston forces the hydraulic fluid from the cylinder 6 through return channels 8 or 9.

The hydraulic fluid is forced by the movement of piston 2 from cylinder 6 into a second cylinder 7. Cylinder 6 communicates with cylinder 7 by means of return channels 8, 9. As control means 4 moves to the right as shown in FIG. 2, piston 2 forces hydraulic fluid through channel 9 and into cylinder 7. Hydraulic fluid is forced out of cylinder 7 through return channel 8 and back into cylinder 6.

A floating piston 3 is located within cylinder 7. A hydraulic fluid enters cylinder 7, through return channel 9, it forces floating piston 3 to the left as viewed in FIG. 2. The floating piston in turn forces hydraulic fluid from cylinder 7, through return channel 10, and into the portion of cylinder 6 which is to the left hand side of piston 2, as viewed in FIG. 2.

The use of floating piston 3 within cylinder 7 aids in avoiding hydraulic lock which may be experienced if only one piston is used in valve damping. Floating piston 3 also dampens shock which may be received by piston 2 if only one piston is used. The use of a second piston and second cylinder also allows cylinder 7 to act as a fluid reservoir.

Located within the return channel 8 is a needle valve 10, which acts as a flow speed valve. The flow speed valve 10 may be rotated to increase, decrease or eliminate the rate of flow of hydraulic fluid through the return channel 8, increasing or decreasing the resistance which the piston 2 incurs as it moves within the cylinder 6, or preventing movement of the piston 2 and control means 4. The flow speed valve 10 as shown, is threaded, and may be engaged to block channel 9, or disengaged, fully or partially, to allow fluid flow through channel 9 to be regulated.

The valve 10 allows the position of the control means 4 to be held in place when valve 10 is engaged. With the valve 10 engaged to prevent flow of hydraulic fluid through channel 9 and within the valve damper, the valve damper prevents the control means from being actuated. Accordingly, the control means may be positioned in a fully or partially the open position or closed (engaged) position and maintained in that position. Significantly, the control means 4 of the device may be positioned anywhere between the full open or full closed position so as to allow less than full flow through the valve as desired. Accordingly, the damper allows for the device to be positioned in a variable fashion as desired, and the valve 10 will hold the device in the desired position. Certain damping devices allow valves to "creep" to a more open or more closed position unless the valve is placed in the fully open or fully closed position. However, the valve 10 allows the valve damper of the present invention to damp the opening and closing of the valve, while providing a means which will positively hold the valve in the fully closed, partially opened or full opened positioned.

The pistons 2,3 incorporate O-rings 12 or similar rings on the pistons which prevent hydraulic fluid from passing through them, so as to control the movement of the hydraulic fluid. The valve 10 is a needle valve which extends into channel 8 so as to intersect the return channel 8 and regulate the flow of hydraulic fluid past the valve 10 as the hydraulic fluid is forced from the cylinders 6,7 by the pistons 2,3.

The control means 4 may be attached to any device of which the rate of travel of a handle or similar control device needs to be damped or regulated.

What is claimed is:
1. A damping control device, comprising:
 a. a first cylinder;
 b. a first piston located within said first cylinder which traverses said first cylinder;

c. a second cylinder which communicates with said first cylinder;

d. a free floating piston located within said second cylinder which moves transversely along the entire length of said second cylinder to expel a constant volume of fluid by one side of said free floating piston into the first cylinder on one side of said first piston, and to expel a constant volume of fluid by an opposite side of said first piston into said second cylinder on an opposite side of said free floating piston, causing a movement thereby of said free floating piston in response to a movement of said first piston, wherein said free floating piston sealingly engages the cylinder walls of said second cylinder so that said free floating piston acts to keep a constant volume of fluid on each side of said free floating piston and corresponding side of said first piston;

e. a control means which causes said first piston to traverse said first cylinder, and to transport fluid from said first cylinder into said second cylinder.

2. A damping control device as described in claim 1, wherein a valve is present in one or more connecting channels to control a flow of said fluid within said damping control device so as to regulate movement of said control means, and to allow the flow of said fluid to be prevented so as to positively lock said first piston and said control means in place.

3. A damping control device, comprising:

a. a first cylinder;

b. A first piston located within said first cylinder which traverses said first cylinder;

c. a second cylinder which communicates with said first cylinder;

d. a free floating piston located within said second cylinder which moves transversely along the entire length of said second cylinder to expel a constant volume of fluid by one side of said free floating piston into the first cylinder on one side of said first piston, and to expel a constant volume of fluid by an opposite side of said first piston into said second cylinder on an opposite side of said free floating piston, causing a movement thereby of said free floating piston in response to a movement of said first piston, wherein said free floating piston sealingly engages the cylinder walls of said second cylinder so that said free floating piston acts to keep a constant volume of fluid on each side of said free floating piston and corresponding side of said first piston;

e. a connecting channel which connects one end of said first cylinder with a corresponding end of said second cylinder, and which transports fluid to and from said first cylinder and said second cylinder as said first piston traverses said first cylinder;

f. an additional connecting channel which connects an opposite end of said first cylinder with an opposite end of said second cylinder, and which transports fluid to and from said first cylinder and said second cylinder as said first piston traverses said first cylinder; and g. a control means which causes said first piston to traverse said first cylinder, and to transport said fluid into and out of said first cylinder and into and out of said second cylinder.

4. A damping control device as described in claim 3, wherein a valve is present in one or more connecting channels to control a flow of said fluid within said damping control device so as to regulate movement of said control means, and to allow the flow of said fluid to be prevented so as to positively lock said first piston and said control means in place.

* * * * *